United States Patent [19]
Makino et al.

[11] Patent Number: 5,104,747
[45] Date of Patent: Apr. 14, 1992

[54] JOINED ASSEMBLY OF CERAMIC AND METALLIC MATERIALS

[75] Inventors: Hiroaki Makino; Nobuo Kamiya; Shigetaka Wada, all of Aichi, Japan

[73] Assignee: Kabushiki Kaisha Toyota Chuo Kenkyusho, Aichi, Japan

[21] Appl. No.: 592,529

[22] Filed: Oct. 4, 1990

[30] Foreign Application Priority Data

Oct. 4, 1989 [JP] Japan .................. 1-259743
May 16, 1990 [JP] Japan .................. 2-127958

[51] Int. Cl.⁵ .................. F16B 4/00; B32B 15/04
[52] U.S. Cl. .................. 428/621; 428/457; 403/29; 403/30
[58] Field of Search ............. 428/621, 627, 632, 633, 428/614, 457, 469; 228/120, 122, 124, 903; 403/30, 29

[56] References Cited

U.S. PATENT DOCUMENTS

| | | | |
|---|---|---|---|
| 3,676,014 | 7/1972 | Bevan et al. | 228/903 |
| 4,485,545 | 12/1984 | Caverly | 403/29 |
| 4,659,245 | 4/1987 | Hirao et al. | 403/30 |
| 4,747,722 | 5/1988 | Kawaguchi | 403/30 |
| 4,778,345 | 10/1988 | Ito et al. | 228/124 |
| 4,886,695 | 12/1989 | Mizuno et al. | 403/30 |
| 4,942,999 | 7/1990 | Oda et al. | 228/124 |
| 4,984,927 | 1/1991 | Kojima et al. | 403/30 |
| 4,991,991 | 2/1991 | Ito et al. | 403/30 |

FOREIGN PATENT DOCUMENTS

| | | | |
|---|---|---|---|
| 880535 | 3/1943 | France | 228/124 |
| 60-251179 | 12/1985 | Japan | 228/122 |
| 61-152902 | 7/1986 | Japan | 228/122 |

OTHER PUBLICATIONS

Patent Abstracts of Japan, & JP-A-62 289385, Dec. 16, 1987, Isao Oda, "Ceramic-Metal Bonded Body".

*Primary Examiner*—John Zimmerman
*Attorney, Agent, or Firm*—Oblon, Spivak, McClelland, Maier & Neustadt

[57] ABSTRACT

A joined assembly of a ceramic member and a metallic member having a hollow cylindrical portion which is open at one end thereof, and closed at the other end, or bottom thereof. The ceramic member has a portion fitted in the cylindrical portion in such a way that any stress acting axially upon the surface of the ceramic member may be reduced at least in the vicinity of the open end of the cylindrical portion. The two members are joined together by shrinkage fitting with at least one brazing material filling the clearance between the two members, or by chemical bonding.

8 Claims, 1 Drawing Sheet

JOINED ASSEMBLY OF CERAMIC AND METALLIC MATERIALS

BACKGROUND OF THE INVENTION

1. Field of the Invention

This invention relates to a joined assembly of ceramic and metallic materials which maintains a high joining strength over a wide range of temperatures.

2. Description of the Related Art

Structural ceramics are used for a wide variety of applications because of their excellent properties including wear resistance and high-temperature strength. They, however, have also a number of drawbacks, including brittleness and low machinability, which limit the scope of their applicability. These drawbacks can be overcome if a ceramic material is used to make only that part of an object of which good wear resistance and high temperature strength are required, and is joined to a metallic material forming the rest thereof. The technique to be used for joining the ceramic and metallic materials is, therefore, of great importance. The methods which are conventionally employed for joining ceramic and metallic materials are divided into two main groups, i.e. mechanical joining methods such as shrink fitting, and chemical bonding methods such as diffusion bonding and active brazing.

Shrink fitting is a simple method, but has the drawbacks of calling for the use of materials having a high degree of machining accuracy, and yet failing to maintain the necessary torque at a high temperature causing the loosening of the assembly. If a larger shrinkage allowance is employed to overcome the latter drawback, an excessively high shrinking pressure acts radially upon the ceramic part and lowers its strength. Therefore, the joined assembly made by shrink fitting can withstand only a temperature up to the maximum temperature that allows the shrinking pressure to develop the necessary torque, or a temperature of about 300° C. to 400° C. The heat resistance of the joined assembly, however, depends on the combination of the materials forming it. It also depends on the method which is employed.

Shrinkage fitting with a filler metal is a modified form of shrink fitting and employs a hot brazing material as a filler for the clearance between the ceramic and metallic parts to be joined. As the brazing material is soft enough to serve as a stress relaxation material between the ceramic and metallic parts, the modified method enables the use of a larger shrinkage allowance than ordinary shrink fitting does. Therefore, it can make a joined assembly which is superior in heat resistance to the product of ordinary shrink fitting.

The size of the shrinkage allowance which is possible depends on the difference in coefficient of thermal expansion between the ceramic and metallic parts, the diameters of the parts to be joined, and the melting point of the brazing material. The use of a brazing material having a higher melting point enables a larger shrinkage allowance and the formation of a joined assembly with higher heat resistance. The use of a brazing material having too high a melting point, however, results in an excessively large shrinkage allowance. Furthermore, the higher the melting point of the brazing material, the harder it usually is, and the less effective it is for stress relaxation. This brings about a reduction in strength of the joint.

Silver brazing filler BAg8 (Japanese Industrial Standards) has a melting point of 780° C. which is higher than that of any other brazing material that is usually employed for the shrinkage fitting with filler metals. A joined assembly formed by using this brazing filler can withstand a temperature up to about 500° C., just below the softening point of the brazing filler. The use of a brazing filler having a still higher melting point, such as nickel brazing filler, makes it possible to obtain a joined assembly with still higher heat resistance, as the effective shrinking pressure is maintained up to a still higher temperature. In a low temperature range, however, excessive shrinkage pressure brings about an undesirable reduction in strength of the joined assembly.

The chemical bonding methods include: a method in which brazing is applied to a metallized surface; a brazing method which employs a brazing filler containing an active metal; and a diffusion bonding method in which solid materials are bonded together through solid diffusion under pressure.

No very high heat resistance can, however, be expected from any product of either of the brazing methods. This is because the maximum temperature that any brazed assembly can withstand is limited by the softening point of the brazing filler employed, and which is usually about 500° C.

On the other hand, diffusion bonding can make a product with high heat resistance. For example, a product of silicon nitride and nickel obtained by the diffusion bonding can withstand a temperature up to about 800° C.

In either event, however, the difference in coefficient of thermal expansion between the ceramic and metallic parts which are bonded together develops residual stress in the bonded assembly in the vicinity of ordinary temperature and thereby degrades its strength, though the interracial bonding strength between those parts may be satisfactory high. It is, therefore, known that a material having a coefficient of thermal expansion between those of the ceramic and metallic parts to be bonded should be interposed therebetween to relax stress. No such material can, however, remove the residual stress completely, but the strength of the bonded assembly as a whole is still lower than the interracial bonding strength between the ceramic and metallic parts.

SUMMARY OF THE INVENTION

It is an object of this invention to provide a joined assembly of ceramic and metallic materials which can maintain a high joining or bonding strength over a wide range of temperatures.

According to one aspect of this invention, there is provided a joined assembly which comprises a ceramic material in the form of a shaft and a metallic material having a hollow cylindrical portion in which the shaft is fitted, the ceramic and metallic materials being so joined together that the resulting axial stress acting upon the surface of the shaft may be reduced at least in the vicinity of the open end of the cylindrical portion.

The assembly exhibits a high joining strength even in a low temperature range in which the highest stress is caused by the joining of the materials by e.g. shrinkage fitting. This is because the structure is such that only a low axial stress acts upon the surface of the ceramic shaft in the vicinity of the open end of the cylindrical portion of the metallic material. This structure also enables the provision of a larger shrinkage allowance in the vicinity of the open end of the cylindrical portion owing to the low axial stress upon the surface of the ceramic shaft. Therefore, the assembly also exhibits a high joining strength in a high temperature range, excellent torque property.

According to another aspect of this invention, there is also provided a joined assembly which comprises a ceramic material in the form of a shaft and a metallic material having a hollow cylindrical portion which has a closed bottom, and in which the shaft is fitted, the shaft having an inner end bonded chemically to the bottom of the cylindrical portion. The other part of the cylindrical portion is bonded to the ceramic material through brazing metal or by shrinkage fitting.

The assembly exhibits a high bonding strength in a high temperature range owing to the chemical (e.g. diffusion) bonding of the inner end of the ceramic shaft to the bottom of the metallic cylindrical portion.

The assembly also exhibits a high bonding strength in a low temperature range, since the two parts thereof are so bonded as to ensure that, even when the assembly is exposed to a temperature lower than the bonding temperature, the development of any large residual stress can be prevented. This has effected by coinciding the deformation of the two parts due to thermal contraction. (Otherwise, the difference in thermal expansion and deformation between the two materials would cause the breakage of their bonding.)

In either event, therefore, this invention provides an assembly of the ceramic and metallic materials joined or bonded together which exhibits a high joining or bonding strength over a wide range of temperatures.

These and other objects, features and advantages of this invention will become more apparent from the following description and the accompanying drawings.

DETAILED DESCRIPTION

Figure 1:
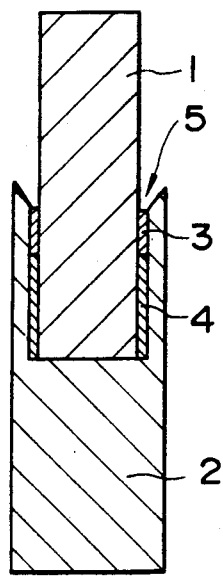
FIGS. 1 to 3 are each a longitudinal sectional view of an assembly embodying one aspect of this invention.

Referring to one aspect of this invention, it is important to ensure that the stress acting axially upon the surface of a ceramic material or part in the form of a shaft be low at least in the vicinity of the open end of a hollow cylindrical portion (in which the shaft is fitted) of a metallic material or part. This important feature can be attained by employing a number of modes or forms of construction, including the mode (A) in which the assembly is so constructed that the ceramic shaft may undergo a lower degree of shrinkage toward the open end of the metallic cylindrical portion than toward the closed end or bottom thereof, i.e. the shaft may have a smaller allowance for shrinkage toward the open end of the cylindrical portion than toward the bottom thereof, and the mode (B) which ensures that only a small amount of friction develop along the junction between the shaft and the cylindrical portion. Still better results of this invention can be achieved if two or more such modes of construction are combined.

If, according to the mode (A), the shaft has a lower degree of shrinkage toward the open end of the cylindrical portion than toward the bottom thereof, it is possible to reduce the stress acting radially upon the shaft toward the open end of the cylindrical portion and therefore the stress acting axially upon the surface of the shaft in the vicinity of the open end of the cylindrical portion.

This type of construction can be realized by, for example, (A') using at least one brazing material having a high melting point to fill the inner portion of the clearance between the ceramic shaft and the cylindrical portion of the metallic material which extends toward the bottom of the cylindrical portion, while the outer portion of the clearance extending toward the open end of the cylindrical portion is filled with at least one brazing material having a low melting point, or (B') using one material for forming that part of the cylindrical portion which is close to its open end and another material for that part thereof close to its bottom, the former being lower in strength and/or thermal expansion.

The use of at least two brazing materials having a high and a low melting point, respectively, as described at (A') above, enables a reduction in the concentration of stress acting radially upon the ceramic shaft toward the open end of the cylindrical portion when the shaft is fitted in the cylindrical portion. This enables a reduction in the stress acting axially upon the surface of the shaft in the vicinity of the open end of the cylindrical portion.

A large allowance for shrinkage is provided by the high-melting-point brazing material which is used to increase the joining strength of the assembly in a high temperature range. A sufficiently high joining torque can, therefore, be obtained even at a high temperature.

If only the high-melting-point brazing material were used, however, it would be likely in a low temperature range that the radial concentration of stress on the ceramic shaft toward the open end of the cylindrical portion might result in the axial concentration of stress on the surface of the shaft in the vicinity of the open end which might cause the ceramic material to break. Therefore, the low-melting-point brazing material is used to fill the outer portion of the clearance to reduce the shrinkage allowance and any axial concentration of stress in that area in a low temperature range. This prevents the bending strength of the joint from lowering.

The combined effects of the high- and low-melting-point brazing fillers enable the assembly to exhibit a high joining torque and a high bending strength over a wide range of temperatures.

The low-melting-point brazing filler is preferably used to cover a distance of 3 to 8 mm. If it fails to cover a distance of at least 3 mm, it will be difficult to produce an effect of sufficient to reduce the concentration of stress caused by the high-melting-point brazing filler. If the covering distance exceeds 8 mm, the low-melting-point brazing filler softened by exposure to a high temperature may cause the two parts of the assembly to move away from axial alignment.

The high-melting-point brazing filler preferably has a melting point which is at least 100° C. higher than the maximum temperature to which the assembly may be exposed, or a melting point which is at least 100° C. higher than a melting point of said low-melting-point brazing material. More specifically, it is advisable to use a brazing filler having a melting point of 800° C. to 1100° C. The low-melting-point brazing filler is required to have a melting point which is higher than the maximum temperature to which the assembly may be exposed in use. In this connection, it is preferable to use a filler having a melting point of 600° C. to 900° C.

It is possible to use two or more high- or low-melting-point fillers, so that the clearance may be filled with three or more brazing materials having different melting points which decrease from the bottom of the cylindrical portion to its open end. This arrangement is useful for improving to a further extent the joining strength of the assembly in a high temperature range and its stress relaxation in a low temperature range.

The use of two metallic materials having different levels of strength and/or thermal expansibility, as stated at (B') above, enables a reduction in the radial concentration of stress on the ceramic shaft toward the open end of the cylindrical portion and thereby a reduction in the axial concentration of stress on the surface of the shaft in the vicinity of the open end. One of the metallic materials is used to form that part of the cylindrical portion which is close to its open end. It is lower in strength than the other and is, therefore, plastically deformable by the stress which is developed in the material adjacent to the open end of the cylindrical portion when the ceramic material is fitted therein. Alternatively, it has a lower coefficient of thermal expansion and provides a small allowance for shrinkage in the area toward the open end of the cylindrical portion. This enables a reduction in the axial concentration of stress which occurs to the surface of the ceramic material in the vicinity of the open end of the cylindrical portion in a low temperature range, and ensures the high flexural strength of the joint. The arrangement of (B') provides as large an allowance for shrinkage as in the case when two or more brazing fillers are used. Therefore, the assembly also maintains a high joining torque in a high temperature range.

The combined effects of the two metallic materials enable the assembly to exhibit a high joining strength over a wide range of temperatures.

The combination of the two metallic materials may be realized by employing, for example, a metallic material of high heat resistance for the bottom part of the cylindrical portion and a metallic material of normal heat resistance for the open-end part thereof, or a metallic material having a high coefficient of thermal expansion for the former and one having a low coefficient of thermal expansion for the latter.

At least one of such alloys as INCOLOY (trademark), INCONEL (trademark) and NIMONIC (trademark) is preferably used as the metallic material with high heat resistance, while at least one of such steels or alloys as SCr, SUE, SCM and SUS (all Japanese Industrial Standards)is preferred as the metallic material with normal heat resistance. At least one of such steels or alloys as SCr, NIMONIC, SUS, INCONEL and INCOLOY is preferred for use as the metallic material having a high coefficient of thermal expansion, while at least one of such alloys as KOVAR (trademark) and INVAR (trademark) is preferred as the metallic material having a low coefficient of thermal expansion.

When two metallic materials with different strengths are combined, it is preferable that the material forming the part close to its open end of the cylindrical portion which be of strength lower than 50 kg/mm$^2$ in term of 0.2% yield strength at 500° C., while the material forming the part close to the bottom of the cylindrical portion be of strength in terms of 0.2% yield strength higher than 50 kg/mm$^2$ at 500° C. When two materials with different coefficients of thermal expansion is combined, it is preferable that the material forming the cylindrical portion close to its open end have a coefficient of thermal expansion lower than $8 \times 10^{-6}$/°C., while the other material has a coefficient of thermal expansion higher than $8 \times 10^{-6}$/°C. A high joining strength over a wide range of temperatures would be obtained from the combination of materials having yield strengths or coefficients of thermal expansion as hereinabove stated.

That part of the cylindrical portion which is formed from the material of low strength or thermal expansibility preferably has a length of 3 to 8 mm. If its length is smaller than 3 mm, it will be difficult to cause sufficient stress relaxation at the open end of the cylindrical portion. If its length is larger than 8 mm, it will be difficult to obtain satisfactory torque property in a high temperature range.

It is possible to use three or more metallic materials having different strengths or coefficients of thermal expansion to form a cylindrical portion having along its length three or more levels of high-temperature strength or thermal expansibility which decrease from its bottom to its open end. This arrangement can further increase a joining strength in a high temperature range and improve stress relaxation in a low temperature range.

The two or more metallic materials can be joined to each other by a variety of methods including welding, brazing, diffusion bonding, electron beam welding and pressure welding. It is advisable to join two or more solid round bars of different metallic materials together first, and then bore them to make a hollow cylindrical shape.

The use of the metallic material having a relatively low strength, or coefficient of thermal expansion for forming the cylindrical portion close to its open end enables a reduction in the concentration of stress on the assembly in that area. This enables a large allowance for shrinkage, and thereby the improved heat resistance of the assembly without the sacrifice of its strength.

The clearance which exists between the shaft and the cylindrical portion forming the assembly is preferably filled with a brazing material. The metallic materials, the shrinkage allowances and the brazing material may be selected, depending on temperatures to be employed.

The decrease of friction between the joined surfaces, as stated at (B) before, enables a reduction in the axial concentration of stress which occur to the ceramic shaft in the vicinity of the open end of the cylindrical member when they are joined. If a high coefficient of friction exists between the surfaces of the shaft and the cylindrical member which are joined by shrinkage fitting, the axial concentration of stress occurs to the shaft in the vicinity of the open end of the cylindrical member and results in a joined assembly with low flexural strength. The same is true of any assembly formed by the modified method for shrinkage fitting which employs a brazing filler.

The decrease of friction between the surfaces of the shaft and the cylindrical member enables a reduction in the axial concentration of stress on the shaft in the vicinity of the open end of the cylindrical member and thereby makes it possible to form an assembly with high joining strength.

A clearance between the shaft and the cylindrical member preferably filled with a brazing material. The reduction of friction between the surfaces of the two members may be achieved by, for example, using a brazing filler which is not reactive with the ceramic material. If the shaft has a rough surface, the brazing filler produces an anchor effect and creates a large amount of friction along the shaft. Therefore, it is important to finish the surface of the shaft to a high degree of smoothness around its circumference. It is alternatively possible to provide the shaft with a surface finish along its axial direction to achieve a decrease of friction along the shaft without having any anchor effect produced.

The brazing filler which is not reactive with the ceramic material is preferably selected from those which do not contain any active metal, such as Ti, Zr, Hf, etc. The surface finish of the shaft which is given around its circumference is preferably performed until it has a surface roughness, $R_{max}$, not exceeding two microns. If it has a rougher surface, the anchor effect of the brazing filler will cause the increase of a coefficient of friction.

According to this invention, the clearance between the ceramic member in the form of a shaft and the metallic member having a hollow cylindrical portion may be filled with a brazing material. In this case, the cylindrical portion has an inside diameter which is larger than the diameter of the shaft. The clearance preferably has a width of 0.1 to 0.2 mm. If it has a smaller width, is difficult to fill the clearance uniformly with the brazing material and to form a sufficiently thick layer of the brazing material for effective stress relaxation. If it has a larger width, a large amount of brazing material is required for filling it.

The cylindrical portion may have an inside diameter which is smaller than the diameter of the shaft, if they are joined by shrinkage fitting without the aid of any brazing material.

Referring now to another aspect of this invention, the shaft and the cylindrical portion of the metallic material are joined preferably by fitting, but any other appropriate method may also be employed.

The end of the ceramic shaft is chemically bonded to the bottom of the cylindrical portion, preferably by diffusion, i.e. by bonding the two solid materials under heat and pressure. The heat treatment for the diffusion bonding is preferably carried out at a temperature of 600° C. to 1000° C. The use of a lower temperature may not cause diffusion sufficient to achieve a high bonding strength, while the use of a higher temperature may cause the deformation of the metallic material. The chemical bonding of the ceramic shaft to the metallic material is limited to the end surface of the shaft. If such chemical bonding is extended to the circumferential surface of the shaft, the residual stress which results from the difference in thermal expansibility between the two materials causes a reduction in strength of the joined assembly.

The clearance which is defined between the ceramic shaft and the cylindrical portion of the metallic material is preferably filled with a brazing material having a melting point of 600° C. to 1000° C. The use of a brazing material having a lower melting point decreases the heat resistance of an assembly, while the use of a brazing material having a higher melting point will decrease the strength of an assembly of because of a larger allowance for shrinkage and therefore a higher shrinking pressure.

According to this invention, the ceramic shaft is preferably joined by fitting to the cylindrical metallic member, but any other appropriate method can also be employed for joining them. The reduction of the stress acting axially upon the surface of the shaft is achieved at least in the vicinity of the open end of the cylindrical member. In other words, it may be achieved only in the vicinity of the open end of the cylindrical member, or along the entire length of the shaft between the open end and the bottom of the cylindrical member.

While the invention has been generally described, a further understanding thereof can be obtained by reference to specific examples which are provided herein for purposes of illustration only and are not intended to be limiting unless otherwise specified.

EXAMPLE 1

A joined assembly (No. 1) embodying this invention was made as shown in FIG. 1, and as will hereinafter be described. A ceramic member was prepared in the form of a round bar or shaft 1 of $Si_3N_4$ having a diameter of 12 mm and a length of 40 mm, and a metallic member in the form of a round bar or shaft 2 of INCOLOY 903 (trademark) having an outside diameter of 16 mm and a length of 45 mm and including a hollow cylindrical portion having an inside diameter of 12.4 mm and a depth of 20 mm. The inner surface of the cylindrical portion of the INCOLOY shaft 2 was electrolessly plated with nickel so as to improve its wettability with brazing materials. The $Si_3N_4$ bar 1 was inserted into the cylindrical portion of the INCOLOY shaft 2 and a clearance 5 was defined therebetween. The inner portion of the clearance 5 closer to the bottom of the cylindrical portion of the INCOLOY shaft 2 was filled to a depth of 15 mm with a high-melting-point brazing material 4 of BNi3 (Japanese Industrial Standards) having a melting point of 980° C., and for 30 minutes in a vacuum furnace with a pressure not exceeding $1 \times 10^{31\ 4}$ torr and a heating temperature of 1100° C. Then, the remaining or outer portion of the clearance 5 closer to the open end of the cylindrical portion of the INCOLOY shaft 2 was filled to a depth of 5 mm with a low-melting-point brazing material 3 of BAg8 having a melting point of 780° C., and kept for 30 minutes in the vacuum furnace with a pressure not exceeding $1 \times 10^{-4}$ torr and a heating temperature of 950° C. The two members 1 and 2 were thus joined to each other to yield a joined assembly (No. 1) embodying this invention.

For the sake of comparison, a joined assembly (No. 1R) was made by following the process as hereinabove described, except that the clearance between the two members was filled along its whole depth with the high-melting-point brazing material.

Each assembly was evaluated for its cantilever bending strength at room temperature. The results are shown in TABLE 1 below. As is obvious therefrom, the assembly embodying this invention exhibited a cantilever bending strength which was over 2.5 times higher than that of the assembly made for the purpose of comparison.

EXAMPLE 2

Figure 2:
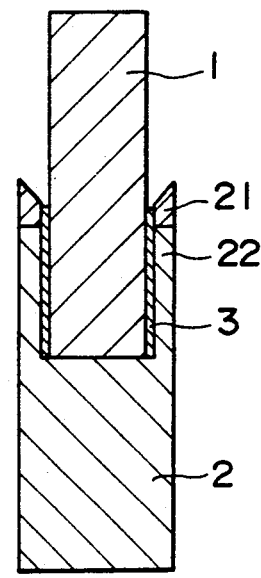

A joined assembly (No. 2) embodying this invention was made as shown in FIG. 2, and as will hereinafter be described. A metallic member in the form of a composite bar or shaft 2 having a hollow cylindrical portion was formed from two metallic materials. Substantially the whole shaft 2 including the greater part 22 of its cylindrical portion was prepared from INCOLOY 903, while the remaining part 21, 5 mm long, of the cylindrical portion terminating at its open end was prepared from SCr440 (Japanese Industrial Standards). The two parts 21 and 22 were joined to each other by electron beam welding and the whole cylindrical portion was so finished by machining as to have an inside diameter of 18.4 mm and a depth of 20 mm. A ceramic member of silicon nitride in the form of a bar or shaft 1 having a diameter of 18 mm was inserted into the cylindrical portion. The two members 1 and 2 were heated to a temperature of 1100° C. in a vacuum furnace, and the clearance which had been defined therebetween was filled with a nickel brazing filler (BNi3) 3, and the two members 1 and 2 were joined together by shrinkage fitting to yield joined assembly No. 2 embodying this invention.

For the sake of comparison, a joined assembly(No. 2R) was made by following the process as hereinabove described, except that the entire metallic member was formed from INCOLOY 903 alone.

Each assembly was evaluated for its cantilever bending strength at room temperature. The results are shown in TABLE 1. As is obvious therefrom, the assembly embodying this invention exhibited a cantilever bending strength which was more than twice higher than that of the comparative assembly.

EXAMPLE 3

Another joined assembly (No. 3) embodying this invention was made by repeating EXAMPLE 2, except that SUH3 (Japanese Industrial Standards) was used to form the end part 21 of the cylindrical portion. Its cantilever bending strength at room temperature was more than twice higher than that of comparative assembly No. 2R, as shown in TABLE 1.

EXAMPLE 4

Another joined assembly (No. 4) embodying this invention was made by repeating EXAMPLE 2, except that a gold brazing filler was used instead of the nickel brazing filler. A comparative joined assembly (No. 4R) was also prepared by following EXAMPLE 2. It was identical to comparative assembly No. 2R, except that a gold brazing filler was substituted for the nickel brazing filler.

Each assembly was evaluated for its cantilever bending strength at room temperature. The results are shown in TABLE 1. As is obvious therefrom, the assembly embodying this invention (No. 4) exhibited a cantilever bending strength which was more than 1.5 times higher than that of comparative assembly No. 4R.

EXAMPLE 5

Figure 3:
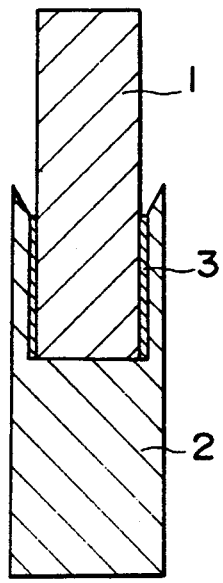

A joined assembly (No. 5-1) embodying this invention was made as shown in FIG. 3, and as will hereinafter be described. The assembly was formed from a $Si_3N_4$ round bar 1 and an INCOLOY shaft 2 which were identical to those used in EXAMPLE 1, except that the ceramic bar 1 had a surface roughness, $R_{max}$, not exceeding 0.3 micron. The $Si_3N_4$ bar 1 was inserted into the INCOLOY shaft 2 and the clearance defined therebetween was filled with a silver brazing filler (BAg8) 3, whereby the assembly (No. 5-1) was obtained.

Another joined assembly (No. 5-2) was made to embody this invention. It was identical to assembly No. 5-1, except for the use of a round bar of $Si_3N_4$ having a surface roughness, $R_{max}$, not exceeding 1.2 microns.

Two comparative joined assemblies were likewise made. One of them (No. 5R-1) was identical to No. 5-1, except for the use of a round bar of $Si_3N_4$ having a surface roughness, $R_{max}$, of 4.2 microns. The other (No. 5R-2) was identical to No. 5-i, except for the use of a silver brazing filler containing 1% of titanium.

Each assembly was evaluated for its cantilever bending strength at room temperature. The results are shown in TABLE 1. As is obvious therefrom, both of the assemblies embodying this invention exhibited a cantilever bending strength which was about twice higher than that of comparative assembly No. 5R-1 and about 20 times higher that of No. 5R-2.

EXAMPLE 6

Figure 4:
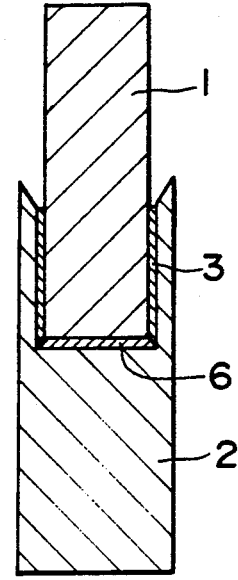
FIG. 4 is a view similar to any of FIGS. 1 to 3, but showing an assembly embodying another aspect of this invention.

A joined assembly (No. 6) embodying the second aspect of this invention was made as shown in FIG. 4, and as will hereinafter be described. The assembly was made of a $Si_3N_4$ round bar 1 and an INCOLOY shaft 2 which were identical in size and shape to those used in EXAMPLE 1. The $Si_3N_4$ bar 1 was inserted into the INCOLOY shaft 2 and a low-melting-point brazing filler (BAg8) 3 was positioned at the top of the clearance defined between the bar 1 and the cylindrical portion of the shaft 2. They were placed in a vacuum hot press and pressed at a pressure of 20 MPa, while they were heated at a temperature of 950° C. for two hours under a pressure not exceeding $1 \times 10^{-4}$ torr, whereby the inner end of the $Si_3N_4$ bar 1 was diffusion bonded to the bottom of the cylindrical portion of the INCOLOY shaft 2 as shown at 6 in FIG. 4, while the clearance therebetween was filled with the brazing filler 3.

Two comparative joined assemblies were also made. One of them (No. 6R-1) was identical to No. 6, except that no brazing material was used to fill the clearance. The other (No. 6R-2) was identical to No. 6, except that no diffusion bonding was done.

Each assembly was evaluated for its cantilever bending strength or torsional torque, or both. The results are shown in TABLE 1 or 2. As is obvious therefrom, the assembly embodying this invention exhibited a cantilever bending strength at room temperature which was four times higher than that of comparative assembly No. 6R-1 of which the two members had been joined by diffusion bonding alone, and a torsional torque at room temperature which was five times higher than that of No. 6R-1. This reveals superiority of this embodiment to the comparative assembly. The assembly embodying this invention also exhibited a torsional torque at 600° C. which was 2.5 times higher than that of comparative assembly No. 6R-2 of which the two members had been joined by the brazing filler alone.

EXAMPLE 7

EXAMPLE 1 was repeated for making a joined assembly Similar to No. 1, except that BAg6 (Japanese Industrial Standards) having a melting point of 690° C. was used as the low-melting-point brazing filler. The assembly, shown as No. 7 in TABLE 1, exhibited at room temperature a cantilever bending strength which was over twice higher than that of comparative assembly No. 1R.

EXAMPLE 8

EXAMPLE 1 was repeated for making a joined assembly similar to No. 1, except that BAu1 (Japanese Industrial Standards) having a melting point of 990° C. was used as the high-melting-point brazing filler. The assembly was evaluated for its cantilever bending strength at room temperature. The result is shown at No. 8 in TABLE 1.

A comparative joined assembly was prepared by using only the same high-melting-point brazing filler (BAu1) to fill the whole clearance and was likewise evaluated for its cantilever bending strength. The result is shown at No. 8R.

As is obvious from TABLE 1, the cantilever bending strength of the assembly embodying this invention was nearly 2.5 times higher than that of comparative assembly No. 1R, and about twice higher that of No. 8R.

EXAMPLE 9

EXAMPLE 6 was repeated for making a joined assembly similar to No. 6, except that INCONEL 713 was used for the metallic member. The assembly, shown as No. 9 in TABLE 1, exhibited at room temperature a cantilever bending strength which was 3.6 times higher than that of comparative assembly No. 6R-1.

This invention is useful for a wide variety of applications including the joining of a ceramic turbo charger to a metallic shaft, the joining of a ceramic gas turbine rotor to a metallic shaft, and the joining of a ceramic rocker arm tip to a metallic member.

TABLE 1

| No. | Cantilever bending strength kg/mm² | No. | Cantilever bending strength Kg/mm² |
|---|---|---|---|
| 1 | 38 | 1R | 15 |
| 2 | 33 | 2R | 15 |
| 3 | 31 | — | — |
| 4 | 35 | 4R | 20 |
| 5-1 | 38 | 5R-1 | 20 |
| 5-2 | 37 | 5R-2 | 2 |
| 6 | 40 | 6R-1 | 10 |
| 7 | 35 | — | — |
| 8 | 37 | 8R | 21 |
| 9 | 36 | — | — |

TABLE 2

| | Torsional torque, kg · m | |
|---|---|---|
| No. | Room temperature | 600° C. |
| 6 | 15 | 5 |
| 6R-1 | 3 | — |
| 6R-2 | — | 2 |

What is claimed is:

1. A joined assembly comprising:
   a ceramic member; and
   a metallic member having a hollow cylindrical portion which is open at one end thereof, said ceramic member having a portion fitted in said cylindrical portion in such a way that and stress acting axially upon the surface of said ceramic member may be reduced at least in the vicinity of said open end of said cylindrical portion wherein a shrinkage allowance in the vicinity of said open end is smaller than in the vicinity of a bottom of said cylindrical portion wherein said portion of said ceramical member and said cylindrical portion define therebetween a clearance extending axially of said ceramic member portion, said clearance having an inner portion leading to said bottom and filled with a high-melting-point brazing material, and an outer portion terminating at said open end and filled with a low-melting-point brazing material which enables said smaller shrinkage allowance.

2. An assembly as set forth in claim 1, wherein said high-melting-point brazing material has a melting point which is at least 100° C. higher than the maximum temperature to which said assembly is exposed in use.

3. An assembly as set forth in claim 1, wherein said high-melting-point brazing material has a melting point of 800° C. to 1100° C.

4. An assembly as set forth in claim 1, further including at least one additional brazing material filling said clearance, said brazing materials in said clearance having at least three different melting points which become lower from said bottom of said cylindrical portion to said open end thereof.

5. An assembly as set forth in claim 1, wherein said portion of said ceramic member is joined to said cylindrical portion with a brazing material which is unliable to react with said ceramic member.

6. An assembly as set forth in claim 1, wherein said outer portion of said clearance is filled with said low-melting-point brazing material by a length of 3 to 8 mm along said ceramic member portion.

7. An assembly as set forth in claim 1, wherein said low-melting-point brazing material has a melting point of 600° C. to 900° C.

8. A joined assembly comprising:
   a ceramic member; and
   a metallic member having a hollow cylindrical portion which is open at one end thereof, said ceramic member having a portion fitted in said cylindrical portion in such a way that any stress acting axially upon the surface of said ceramic member may be reduced at least in the vicinity of said open end of said cylindrical portion, wherein friction is decreased between said portion of said ceramic member and said cylindrical portion, wherein said portion of said ceramic member has a surface roughness, $R_{max}$, not exceeding two microns around its circumference.

* * * * *